Jan. 13, 1953    J. W. STEWART    2,625,144
ACCESSORY PUMP STRUCTURE FOR ENGINES
Filed Aug. 23, 1948    2 SHEETS—SHEET 1
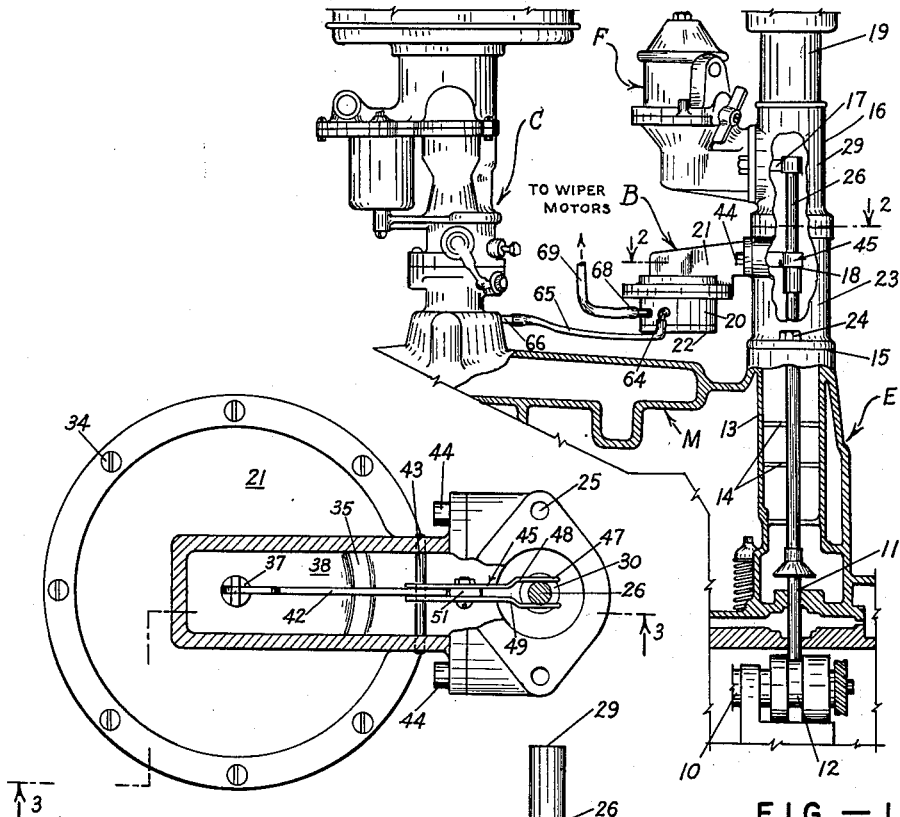
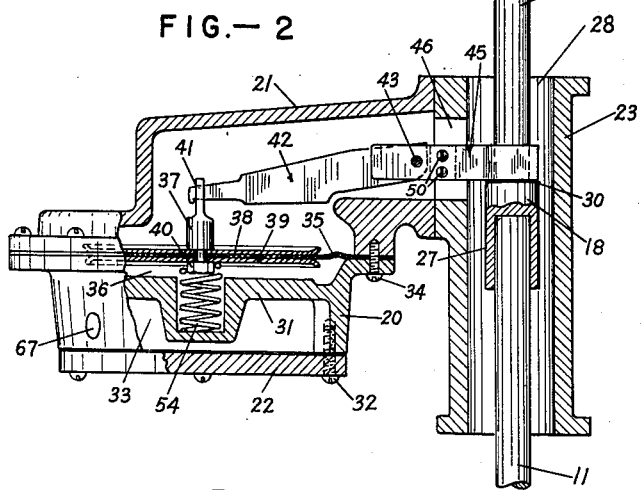
FIG.— 1
FIG.— 2
FIG.— 3
INVENTOR.
John W. Stewart
BY
Lamphere and Van Valkenburgh
ATTORNEYS

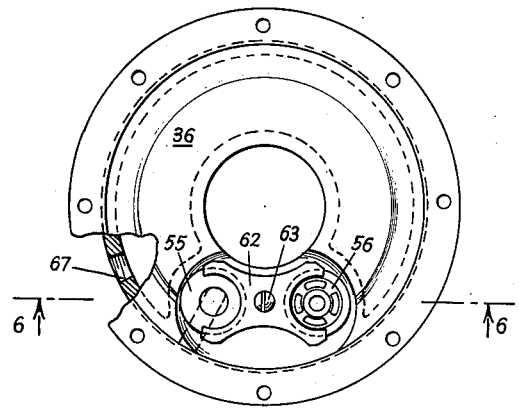
FIG.—5
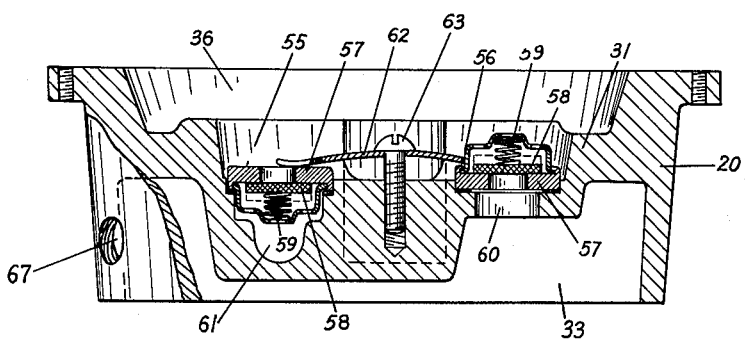
FIG.—6
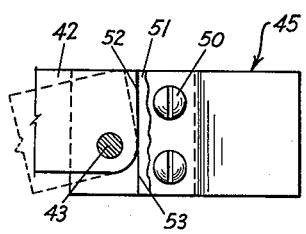
FIG.—4
INVENTOR.
John W. Stewart
BY
Lamphere and Van Valkenburgh
ATTORNEYS Patented Jan. 13, 1953

2,625,144

UNITED STATES PATENT OFFICE 2,625,144

ACCESSORY PUMP STRUCTURE FOR ENGINES

John W. Stewart, Golden, Colo.

Application August 23, 1948, Serial No. 45,683

7 Claims. (Cl. 123—195)

This invention relates to pumps and more particularly one to be used as a booster for devices operated by a source of sub-atmospheric pressure or vacuum such as the intake manifold of an internal combustion engine.

One of the object of the invention is to produce an improved booster pump that can be employed as an accessory on motor vehicles to provide an auxiliary source of sub-atmospheric pressure when the operation of the engine is such that insufficient suction is present for purposes desired.

A further object is to produce a vacuum booster pump that can be quickly and easily installed on existing vehicle engines so as to be positively driven, whenever the engine is operating, by the same mechanism employed to drive the engine fuel pump.

Another object is to produce an improved vacuum booster pump which will function to provide a source of sub-atmospheric pressure only when a vehicle engine fails to provide a sufficient degree of vacuum to properly operate a windshield wiper motor or other suction operated device connected to the vehicle engine intake manifold.

Still another object is to provide improved mounting and driving means for a vacuum booster pump which will permit the booster pump to be mounted in place of the fuel pump and the fuel pump remounted on the booster pump, with both pumps driven by the same cam means which was used to drive the fuel pump only.

Yet a further object is to so construct a vacuum booster pump and driving means therefor that it can be installed for operation by the fuel pump driving means of an engine by a replacing of the fuel pump with the booster pump and then a reconnecting of the fuel pump to its driving means by a remounting of the fuel pump on the vacuum booster pump.

Other objects of the invention will become apparent from the following description taken in connection with the accompanying drawings in which:

Figure 1 is a side view with parts broken away showing a vacuum booster associated with an internal combustion engine for operation thereby in accordance with my invention;

Figure 2 is a section view taken on the line 2—2 of Figure 1;

Figure 3 is a vertical sectional view taken on the line 3—3 of Figure 2;

Figure 4 is a view showing the details of the driving arm;

Figure 5 is a top view of the body member of the booster pump showing details of the valves; and Figure 6 is a sectional view showing additional details of the valves, said view being taken on the line 6—6 of Figure 5.

Referring to the drawings in detail and first to Figure 1, there is disclosed a portion of a vehicle internal combustion engine E having an intake manifold M with which is associated the usual carburetor C, by means of which fuel is supplied to the cylinders of the engine, said fuel coming from a fuel pump F. The engine illustrated is a Ford V-8. In such engine the cam shaft 10 thereof at the rear of the engine is arranged to reciprocate a vertically extending rod 11 by means of a cam 12 rotating with the cam shaft. This rod 11 extends upwardly through a tubular passage 13 at the rear of the engine, which passage has inwardly extending flanges 14 forming guides for the reciprocal rod 11.

The engine block at the top of the tubular passage 13 is provided with a flat surface 15. This flat surface, as the engine comes from the factory, has mounted thereon the fuel pump F, shown in Figure 1 as being mounted above my improved booster vacuum pump B when such booster pump is installed. The mounting of the fuel pump is by means of its cylindrical member or adapter 16, but in certain installations this adapter is eliminated. The fuel pump F is of well known construction and is not illustrated in detail. It is driven by means of an arm 17 and this arm, when the fuel pump is mounted on the flat surface 15 at the top of the engine block, is arranged to be engaged by the flat end 18 at the top of the reciprocal rod 11. With this factory installation connection, the arm 17 will be caused to be so moved as to operate the fuel pump in accordance with the reciprocation with the rod 11 as it is moved by the cam 12 and the rotation of the cam shaft. The cylindrical member or adapter 16 of the fuel pump carries a tubular extension 19 which serves as an inlet for receiving oil to be poured into the crank case of the engine. The inlet has a removable breather cap thereon which is not shown.

My improved vacuum booster pump B, which is to be mounted in place of the fuel pump F, as factory installed, and then the fuel pump mounted above the booster pump, comprises four casing parts, namely, a main body 20, the cover 21, a bottom plate 22 and a cylindrical member 23. The cylindrical member 23 is employed for attaching the booster pump in interposed position between the fuel pump F and the block of the engine E. The lower end of the cylindrical member is provided with flanges of a shape to fit onto the flat surface 15, primarily designed to attach the fuel pump as already indicated. Bolts 24 are employed to connect the lower end of the cylindrical member 23 to the engine block. The upper end of the cylindrical member 23 is formed to complement the lower end of the cylindrical portion or adapter 16 of the fuel pump, and thus after the fuel pump and adapter are removed from the engine block, it can be mounted in the position shown in Figure 1 on the top end of the cylindrical member 23 by means of bolts 25 passing through flanges, said bolts being shown in section in Figure 2. When the fuel pump and adapter are mounted on top of the cylindrical member 23 of the booster pump, the pump arm will no longer be connected with the reciprocating rod 11. In order to produce a connection between the reciprocating rod and the drive arm 17 of the fuel pump, there is provided an extension rod 26, the lower end of which has a bore 27 for fitting over the end of the rod 11. The upper end of this extension rod 26 has a flat surface 29 which will engage and operate the fuel pump actuating arm 17 in the same manner that the arm was reciprocated by the rod 11 when the fuel pump was factory attached to the top of the engine block at the surface 15. The lower end of the extension rod has a shoulder 30 by means of which the booster pump will be operated, as will become apparent.

Referring now to Figures 2 to 6, inclusive, the details of my improved vacuum booster pump B will be described. The body 20, as best shown in Figure 6, is of annular form and is provided with a horizontal partition 31. Thus, with this partition and the bottom plate 22 which is attached to the body member by screws 32, there is established a chamber 33 below the partition. The top part of the body member is flanged, and to this flange is secured the previously referred to cover member 21 by means of screws 34. Between the body member 20 and the cover member 21 is a diaphragm 35 which has its peripheral portion clamped between said members. The partition 31 in the body member extends across the body member somewhat below the top of the body member and thus, with the diaphragm clamped as shown, there will be provided a chamber 36 between the partition and the diaphragm, said chamber being variable in volume by moving the diaphragm.

The central part of the diaphragm has secured to it a rod 37 and the diaphragm is centrally reinforced by top and bottom plates 38 and 39 which are clamped to the diaphragm by the rod and its attaching nut 40. The upper end of the rod is provided with an eye 41 and received in this eye is the free end of an arm 42 pivoted on a pin 43 extending across the channel portion of the cover member and closely adjacent to the cylindrical member 23 to which the cover member is attached by bolts 44 (see Figure 1). The pivot pin 43 also has pivoted thereon an arm 45 which extends through an opening 46 in the cylindrical member 23 and has a forked end 47 which is arranged to be engaged by the shoulder 30 on the extension rod 26 driven by the cam shaft of the engine when the booster pump is installed. The arm 45 is formed from two flat pieces 48 and 49 clamped together by screws 50. Interposed between these two pieces and held by the screws is a block 51.

As best shown in Figure 4, it will be seen that the pivoted end of the arm 42 is received between the two pieces of arm 45 and the end edge of arm 42 is formed with a flat surface 52 which can be engaged by a flat end surface 53 on the block 51 whenever the two arms 42 and 45 are aligned. Thus, if the arm 45 should be swung in a counter-clockwise direction (Figure 4) about the pivot pin 43, it can move the arm 42 by the block engaging the flat end surface 52 of the arm 42.

As shown in Figure 3, the diaphragm 35 is arranged to be normally biased upwardly by means of a coil spring 54, and thus when this spring is effective on the diaphragm to move it to its extreme upper position, the arm 42 will always be so biased that the arm will remain in engagement with the block 53, and thus whenever there is reciprocation of the driving rod 11 the diaphragm will be vibrated back and forth by arm 45 to thus vary the volume of the chamber 36. However, if the diaphragm should be pulled downwardly, as will happen if there is a certain degree of sub-atmospheric pressure present in the chamber 36, then there will be no movement of the arm 42 by the reciprocation of the rod 11.

Communication between the opposite sides of the partition 31 in the body member is arranged to be controlled by two valves 55 and 56. Both of these valves are one way valves and of identical construction. Briefly described, each valve comprises an annular valve seat 57 and a movable valve element in the form of a wafer 58 held against the valve seat by a spring 59 which is interposed between the valve element and a perforated cap attached to the valve seat. Both valves are of unitary construction. The valve 56 is arranged to cooperate with a port 60 in the partition and permits communication only from the chamber 33 to the chamber 36 below the diaphragm. The valve 55 is arranged to be associated with the inner end of a passage 61 which enters into the partition from the exterior portion of the body member 20. The two valves are arranged to be clamped in sealed relation with the partition by means of a spring clip 62, having U-shaped ends with one end engaging one valve and the other end engaging the other valve. The clip applies pressure to the valves to hold them sealed to the partition by the action of a screw 63 threaded into the partition between the valves.

The previously referred to passage 61 has a nipple 64 to which is connected a rubber tube 65 leading to a nipple 66 connected into the manifold M of the engine, all as illustrated in Figure 1. The chamber 33 in the body member below the partition is provided with an outlet port 67 with which is associated a nipple 68 and connected thereto is a tube 69 which can be connected to any suction operated device which, as indicated in Figure 1, can be the windshield wiper motors of the vehicle.

In vehicles in which my booster pump B is not provided, the windshield wiper motors are directly connected to the nipple 66 leading to the intake manifold M of the engine, and under such conditions the sub-atmospheric pressure, which is effective to operate the windshield wiper motors, will always vary in accordance with the sub-atmospheric pressure or degree of vacuum in the intake manifold M. When my booster pump B is installed, as disclosed in Figure 1, that is, with the pump being capable of being driven by the reciprocating rod 11, the motors connected with the tube 69 and the booster pump connected with the manifold by the tube 65, it will be possible to always have available an auxiliary source of sub-atmospheric pressure or vacuum for the operated motors whenever there is insufficient vacuum present in the manifold M. As is well known, the degree of vacuum in the manifold will vary under various operating conditions of the vehicle. The greatest degree of vacuum is present in the intake manifold when the engine is idling. When the engine is under a heavy load, such as going up a hill, there will be very little vacuum present in the intake manifold and, consequently, if windshield wiper motor or other suction motors are directly connected to the manifold, there will not be sufficient differential fluid pressure present to operate the windshield wiper motors or other devices. However, with the use of my improved booster, this insufficiency of sub-atmospheric pressure will not occur, regardless of operating conditions of the engine.

When there is a considerable degree of vacuum in the intake manifold M of the engine, it will be seen that air can be drawn from the windshield wiper motors, because then the suction from the manifold will cause an opening of the valve 55 and an opening of the valve 56 so that air can be pulled from the windshield wiper motors by way of chamber 33, chamber 36 and the tube 65 connected to the manifold. When there is vacuum present in the chamber 36 above the partition and below the diaphragm 35 of the pump, the diaphragm will be pulled downwardly against the action of the spring 54 due to the differential pressure effective on the diaphragm. Pulling down of the diaphragm will also pull the lever 42 downwardly and then, regardless of the reciprocation of the rod 11 by operation of the engine and the oscillation of the arm 45, there will be no oscillation of the arm 42 since the oscillation of the arm 45 by the rod is insufficient to cause the block 51 to engage the end of the surface 52 of the pivoted arm 42. However, if at any time, due to operating conditions of the engine, the degree of vacuum in the chamber 36 should decrease to such an extent that the spring 54 can move the diaphragm 34 upwardly, then the arm 42 will begin to be oscillated by the reciprocation of the rod 11, such oscillation taking place by the oscillation of the arm 45. Each time that the arm 45 is swung in a counter-clockwise direction it will push the free end of the arm 42 downwardly, and then when the reciprocating rod 11 moves downwardly the spring 54 will expand and cause the arms 42 and 45 to swing as a unit in a clockwise direction about the pivot pin 43. Thus, the diaphragm will be moved downwardly by positive action of the rod and moved upwardly by the expanding action of the spring 54. This will result in the vibration of the diaphragm and a varying of the volume of the chamber 36. Due to the arrangement of the valves, it will be seen that as the diaphragm moves downwardly, air can be pushed out through the valve 55. When the diaphragm moves upwardly, the valve 55, being a one way valve, will remain closed and the valve 56 also being a one way valve, but acting in the opposite direction, will open and permit air to be drawn into the chamber 36. This air drawn in will come from the windshield wiper motors or other devices since the chamber 33 is connected thereto. It will thus be seen that the booster pump acts as a vacuum pump and is a source of vacuum, supplementing the vacuum of the intake manifold, and will continue to cause operation of the windshield wiper motors or other suction motors, notwithstanding the vacuum in the intake manifold may be insufficient.

It is believed to be readily apparent that my improved booster pump can be very quickly and easily installed on a vehicle engine such as that illustrated. To make the installation, all that needs to be done is remove the fuel pump F with the adapter 16 which will be attached to the surface 15 of the engine block. Then place the extension rod on the end of rod 11 and the cylindrical member 23 of the booster pump on this surface 15 and bolt said member to the engine block. When this is done the forked end of the arm 45 will be in position to be engaged by the shoulder 30 on the extension rod. Following this attachment of the cylindrical member 23 of the booster pump the fuel pump and adapter 16 are mounted on top of the cylindrical member 23 of the booster pump. The hose 69 is then connected to the booster pump and the new hose 65 connected between the booster pump and manifold. The operating arm 17 of the fuel pump will fit against the top flat end of the extension rod 26 and as the rod 11 reciprocates it will be operated in the same manner as it was before installing the booster pump.

It will be particularly noted that my booster pump will be operated only when insufficient vacuum is present in the intake manifold to cause desired operation of the windshield wiper motors or other devices. When sufficient vacuum is present in the manifold, then the diaphragm 35 is held downwardly by differential fluid pressure and the arm 42 cannot be operated. However, as soon as the vacuum in the intake maniold decreases to a point where the spring 54 can move the diaphragm upwardly, the booster pump will come into operation to thus provide an auxiliary source of sub-atmospheric pressure and insure that the windshield wiper motors or other vacuum operated devices will continue to be operated. Another important feature to be noted is the connecting arms between the diaphragm and the reciprocating rod 11. With this particular connection, little noise will be present when the booster pump is not operated as the arm 45 will be free to pivot independently of arm 42 and the forked end can remain in engagement with shoulder 30. This eliminates continuous hitting of the forked end by shoulder 30, as would be the case if the arms 42 and 45 were a single unit.

Although I have illustrated a particular structure embodying my invention, it is believed to be apparent that it can be readily modified so as to permit it to be mounted on types of engines other than the one shown, and particularly those in which a rod is not used as a connection between the cam shaft and the fuel pump. One of the essential features of the invention is the provision of a vacuum booster pump structure so designed that it can be mounted in place of the fuel pump, regardless of its particular driving connection, and then allow for the remounting of the fuel pump on the booster pump with both pumps being driven from the fuel pump driving cam without the necessity of altering the fuel pump operating arm or other fuel pump structure. All necessary modifications can be made without departing from the fundamental principles of the invention and, therefore, it is not intended that the scope of the invention be limited except in accordance with the appended claims.

What is claimed is:

1. In a vacuum pump structure for operation by the reciprocable rod of an engine employed to drive an engine fuel pump which fuel pump has an operating lever and is normally mounted directly on the engine block, said structure comprising a vacuum pump having a mounting member provided with an opening therethrough, said member being so constructed at one end of the opening as to be mounted on the engine block in place of the fuel pump and so constructed at the other end of the opening as to permit remounting of the fuel pump thereon, a vacuum pump operating arm extending into the opening, and means connectable with the end of the reciprocable rod that normally operates the fuel pump and extending through the opening for operating both the vacuum pump operating arm and the fuel pump operating lever without removal of the reciprocating rod.

2. In a vacuum pump structure for operation by the reciprocable rod of an engine employed to drive an engine fuel pump which fuel pump has an operating lever and is normally mounted directly on the engine block, said structure comprising a vacuum pump having a mounting member provided with an opening therethrough, said member being so constructed at one end of the opening as to be mounted on the engine in place of the fuel pump and so constructed at the other end of the opening as to permit remounting of the fuel pump thereon, a vacuum pump operating arm extending into the opening, and means for operating both the vacuum pump operating arm and the fuel pump operating lever by the said reciprocable rod without change or removal thereof and comprising an extension rod connected with the end of the reciprocable rod and extending through the opening in the mounting member.

3. In a vacuum pump structure for operation by the reciprocable rod of an engine employed to drive an engine fuel pump which fuel pump has an operating lever and is normally mounted directly on the engine block, said structure comprising a vacuum pump having a mounting member provided with an opening therethrough, said member being so constructed at one end of the opening as to be mounted on the engine in place of the fuel pump and so constructed at the other end of the opening as to permit remounting of the fuel pump thereon, a vacuum pump operating arm extending into the opening and having a forked end, and an extension rod mounted on the end of the said reciprocable rod without change or removal thereof and extending through the opening for operating the fuel pump operating lever, said extension rod having shoulder means for engaging the forked end of the vacuum pump operating arm.

4. In a vacuum pump structure for association with a reciprocable fuel pump operating rod projecting from an engine block, said structure comprising a vacuum pump having a member constructed to be mounted in place of the fuel pump and to have the fuel pump mounted thereon, and means comprising a member connectable with the end of the reciprocable rod without change or removal thereof for driving the fuel pump and the vacuum pump.

5. In a vacuum pump structure for association with a reciprocable fuel pump operating rod projecting from an engine block, said structure comprising a vacuum pump having a member constructed to be mounted in place of the fuel pump and to have the fuel pump mounted thereon, and means comprising a member connectable with the reciprocable rod for driving the fuel pump and the vacuum pump, said last named means comprising an extension rod having an end socket for slidably mounting on the end of the reciprocable rod without change or removal thereof and extending through the mounting member of the vacuum pump.

6. In a vacuum booster pump for attachment to an engine block having a mounted fuel pump driven by a reciprocable rod extending to the exterior of the block, said booster pump comprising a cylindrical mounting member, a suction pump, a suction pump cover for attaching the pump to the mounting member, and pump operating means including an arm pivoted in the cover and extending into the cylindrical mounting member, said cylindrical mounting member being constructed at one end for mounting on the engine in place of the fuel pump and at its other end for remounting the fuel pump, an extension rod connected to the end of the reciprocating rod without change or removal thereof and extending through the cylindrical mounting member to operate the remounted fuel pump, and means for connecting the extension rod to the suction pump operating arm extending into the cylindrical mounting member so that said lever can be oscillated by reciprocation of the extension rod with the reciprocable rod.

7. In a vacuum pump structure for association as an accesory with an engine block having a fuel pump mounted thereon and driven by cam means rotatable by operation of the engine, said vacuum pump comprising a pump having a portion constructed to be mounted on the engine block in place of the fuel pump and further constructed to have the fuel pump without alteration to be remounted on said member, and means for connecting both the vacuum pump and fuel pump to the cam means so as to be operated thereby, said last named means permitting the fuel pump to be connected to be operated by the cam means without alteration or removal of any of the fuel pump operating structure as employed when the fuel pump was mounted on the engine block.

JOHN W. STEWART.

REFERENCES CITED

The following references are of record in the file of this patent:

UNITED STATES PATENTS

| Number | Name | Date |
|---|---|---|
| 1,734,009 | Golden | Oct. 29, 1929 |
| 1,857,675 | Babitch | May 10, 1932 |
| 2,018,111 | Babitch | Oct. 22, 1935 |
| 2,104,447 | Babitch | Jan. 4, 1938 |
| 2,104,448 | Babitch et al. | Jan. 4, 1938 |
| 2,282,857 | Ericson | May 12, 1942 |
| 2,482,332 | Eckert | Sept. 20, 1949 |

FOREIGN PATENTS

| Number | Country | Date |
|---|---|---|
| 797,157 | France | Apr. 22, 1936 |